(12) United States Patent
Balasubramanian et al.

(10) Patent No.: US 12,200,662 B2
(45) Date of Patent: *Jan. 14, 2025

(54) SYSTEM AND METHOD FOR VEHICLE-TO-PEDESTRIAN PAGING ON A SIDELINK CHANNEL

(71) Applicant: QUALCOMM Incorporated, San Diego, CA (US)

(72) Inventors: Anantharaman Balasubramanian, San Diego, CA (US); Shuanshuan Wu, San Diego, CA (US); Tien Viet Nguyen, Bridgewater, NJ (US); Gabi Sarkis, San Diego, CA (US); Kapil Gulati, Belle Mead, NJ (US); Sudhir Kumar Baghel, Hillsborough, NJ (US); Chang-Sik Choi, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/148,483

(22) Filed: Jan. 13, 2021

(65) Prior Publication Data

US 2021/0219262 A1 Jul. 15, 2021

Related U.S. Application Data

(60) Provisional application No. 62/961,603, filed on Jan. 15, 2020.

(51) Int. Cl.
*H04W 68/00* (2009.01)
*H04W 4/40* (2018.01)
(Continued)

(52) U.S. Cl.
CPC ......... *H04W 68/005* (2013.01); *H04W 4/40* (2018.02); *H04W 72/02* (2013.01);
(Continued)

(58) Field of Classification Search
CPC ..... H04W 68/005; H04W 4/40; H04W 72/02; H04W 72/0446; H04W 72/0453;
(Continued)

(56) References Cited

U.S. PATENT DOCUMENTS

| 2015/0119088 A1* | 4/2015 | Lee ............... H04W 68/02 455/458 |
| 2017/0374642 A1 | 12/2017 | Lee et al. |

(Continued)

FOREIGN PATENT DOCUMENTS

CN 110115080 A 8/2019

OTHER PUBLICATIONS

International Search Report and Written Opinion—PCT/US2021/013454—ISA/EPO—Apr. 20, 2021.

*Primary Examiner* — Thinh D Tran
(74) *Attorney, Agent, or Firm* — Arent Fox LLP

(57) ABSTRACT

In an aspect of the disclosure, a method, a computer-readable medium, and an apparatus are provided. The apparatus may be a pedestrian user equipment (PUE). The apparatus may be configured to monitor a first set of resources to detect a paging indicator indicating a paging message is carried on a second set of resources allocated for vehicle-to-pedestrian (V2P) communication consecutive to the first set of resources; to decode information on the second set of resources to detect the paging message from a second UE when the paging indicator is detected, the paging message being associated with the V2P communication; and to refrain from decoding the information on the second set of resources when the paging indicator is undetected.

26 Claims, 10 Drawing Sheets

(51) Int. Cl.
    *H04W 72/02*         (2009.01)
    *H04W 72/044*      (2023.01)
    *H04W 72/0446*     (2023.01)
    *H04W 72/0453*     (2023.01)

(52) U.S. Cl.
    CPC ... *H04W 72/0446* (2013.01); *H04W 72/0453* (2013.01); *H04W 72/0466* (2013.01)

(58) Field of Classification Search
    CPC ......... H04W 72/0466; H04W 74/0808; H04W 76/14; H04W 76/27; H04W 68/025; H04L 5/0053; H04L 5/0051
    See application file for complete search history.

(56) References Cited

U.S. PATENT DOCUMENTS

| | | |
|---|---|---|
| 2018/0109937 A1 | 4/2018 | Lee et al. |
| 2018/0192397 A1* | 7/2018 | Seo .................... H04L 27/0006 |
| 2019/0075447 A1* | 3/2019 | Lee ...................... H04W 68/02 |
| 2019/0182784 A1* | 6/2019 | Harada ................. H04W 68/02 |
| 2019/0363843 A1* | 11/2019 | Gordaychik .......... H04W 52/58 |
| 2020/0022105 A1* | 1/2020 | Fu ...................... H04W 52/0229 |
| 2020/0304968 A1* | 9/2020 | Lee ......................... H04W 4/40 |
| 2021/0152992 A1 | 5/2021 | Balasubramanian et al. |
| 2022/0039061 A1* | 2/2022 | Murray ................. H04W 68/02 |
| 2022/0094481 A1* | 3/2022 | Hong .................... H04L 1/1812 |

\* cited by examiner

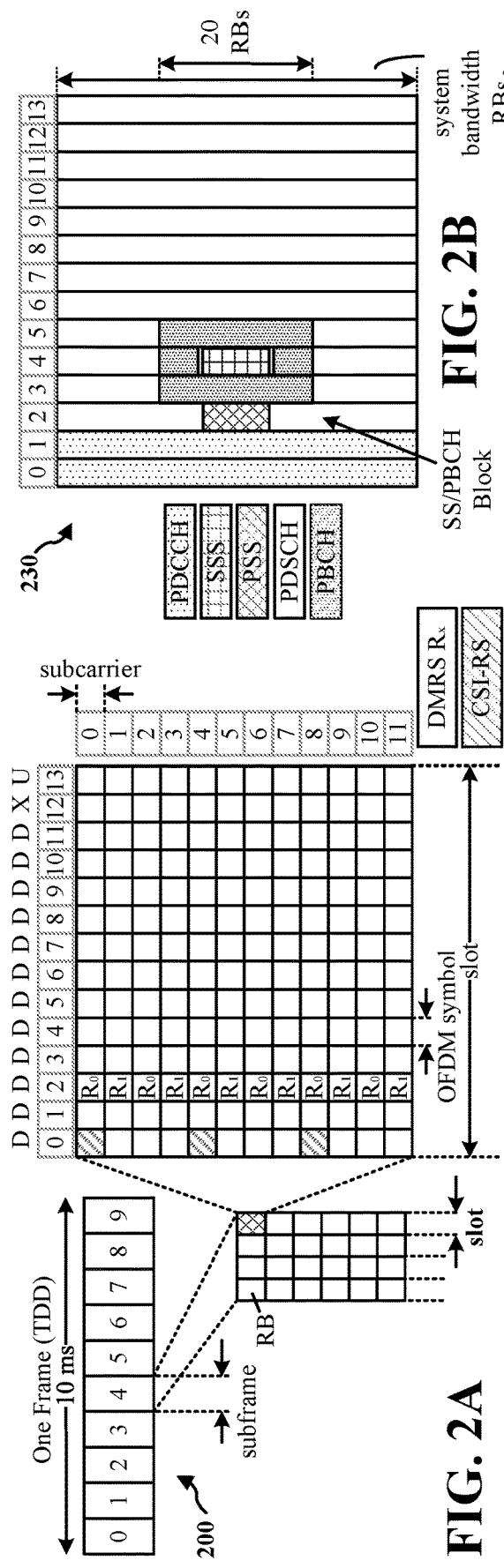
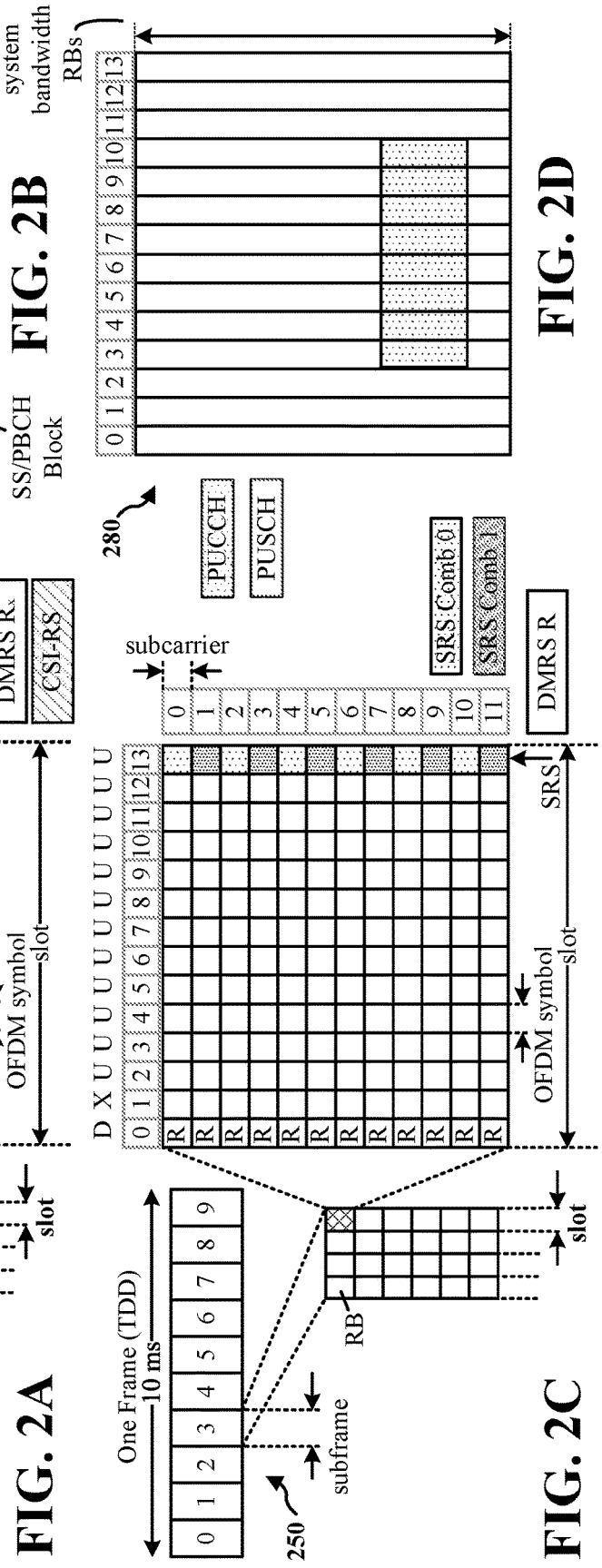
FIG. 2A  FIG. 2B  FIG. 2C  FIG. 2D

SYSTEM AND METHOD FOR VEHICLE-TO-PEDESTRIAN PAGING ON A SIDELINK CHANNEL

CROSS REFERENCE TO RELATED APPLICATION(S)

This application claims the benefit of U.S. Provisional Application Ser. No. 62/961,603, entitled "SYSTEM AND METHOD FOR VEHICLE-TO-PEDESTRIAN PAGING ON A SIDELINK CHANNEL" and filed on Jan. 15, 2020, the disclosure of which is expressly incorporated by reference herein in its entirety.

BACKGROUND

Technical Field

The present disclosure relates generally to communication systems, and more particularly, to a user equipment configured to communicate paging messages associated with vehicle-to-pedestrian communication on sidelink channels.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various radio access technologies (RATs), vehicle-to-pedestrian (V2P) communication may refer to communication transmitted from a user equipment (UE) associated with a vehicle (also referred to as a VUE) to another UE associated with a pedestrian (also referred to as a PUE). Correspondingly, P2V communication may refer to communication transmitted from a PUE to a VUE.

V2P communication may be used for pedestrian safety. For example, V2P communication may be used by a VUE to notify a PUE that the two are on a collision course. Further, P2V communication may further contribute to pedestrian and/or vehicular safety. For example, P2V communication may be used by a PUE to notify a VUE of a PUE position and/or anticipated route of travel.

In some aspects, one or both of V2P and/or P2V communications may be relatively infrequency. However, one or both of V2P and/or P2V communications may still rely on relatively low latency in order to contribute to pedestrian and/or vehicular safety. In addition, PUEs may be subject to some power constraints and, therefore, may be unable to continuously monitor for V2P communication. Accordingly, a need exists for efficient and reliable approaches and solutions to V2P and/or P2V communications.

The present disclosure provides various approaches and solutions to resource allocation for PUEs and VUEs. For example, the present disclosure describes various approaches and solutions to resource allocation for VUEs to notify PUEs that consider safety (e.g., low latency and reliability) and power consumption (e.g., by PUEs).

In an aspect of the disclosure, a method, a computer-readable medium, and an apparatus are provided. The apparatus may be a PUE. The apparatus may be configured to monitor a first set of resources to detect a paging indicator indicating a paging message is carried on a second set of resources allocated for V2P communication consecutive to the first set of resources; decode information on the second set of resources to detect the paging message from a second UE when the paging indicator is detected, the paging message being associated with the V2P communication; and refrain from decoding the information on the second set of resources when the paging indicator is undetected.

In another aspect of the disclosure, another method, another computer-readable medium, and another apparatus are provided. The other apparatus may be a VUE. The other apparatus may be configured to transmit a paging indicator on a first set of resources indicating a paging message is scheduled on a second set of resources allocated for V2P communication consecutive to the first set of resources; and transmit the paging message on the second set of resources after transmitting the paging indicator, the paging message being associated with the V2P communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
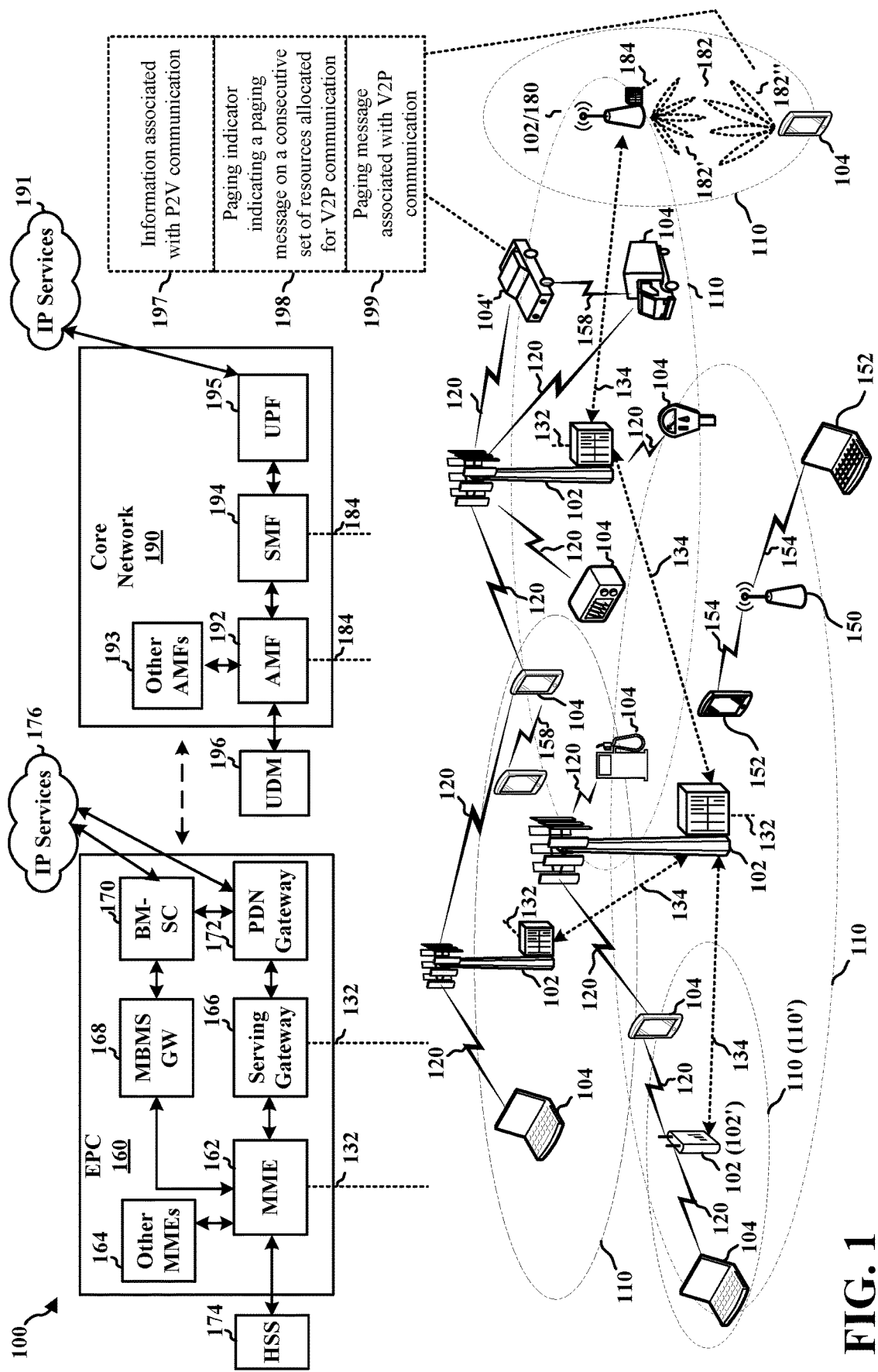
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHZ and 30 GHz, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 191. The IP Services 191 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies. Further, although the present disclosure may focus on vehicle-to-pedestrian (V2P) communication and pedestrian-to-vehicle (P2V) communication, the concepts and various aspects described herein may be applicable to other similar areas, such as D2D communication, IoT communication, vehicle-to-everything (V2X) communication, or other standards/protocols for communication in wireless/access networks.

Referring again to FIG. 1, in certain aspects, the wireless communications system and an access network 100 may include a UE 104 associated with a pedestrian, which may also be referred to as a PUE, and a UE 104' associated with a vehicle, which may also be referred to as a VUE. The PUE 104 and the VUE 104' may be configured to communicate on one or more sidelink channels, such as one or more of a PSBCH, a PSDCH, a PSSCH, a PSCCH, and/or a PSFCH. Signaling transmitted by the PUE 104 to the VUE 104' may be referred to as P2V communication, whereas signaling transmitted by the VUE 104' to the PUE 104 may be referred to as V2P communication.

The VUE 104' may be configured to transmit a paging indicator 198 on a first set of resources indicating a paging message 199 is scheduled on a second set of resources allocated for V2P communication consecutive to the first set of resources. In one aspect, the paging indicator 198 may include and/or may be based on a common sequence, such as when the paging message 199 is intended for a group of UEs (e.g., all PUEs within the coverage area of paging indicator transmission). In another aspect, the paging indicator 198 may include and/or may be based on a sequence that identifies the PUE 104, such as when the paging message 199 is specifically intended for the PUE 104.

Further, the VUE 104' may be configured to transmit the paging message 199 on the second set of resources after transmitting the paging indicator 198. The paging message 199 may be associated with V2P communication. In some aspects, the second set of resources may be non-dedicated to V2P communication—e.g., other types of communication may occur on the second set of resources, as well, such as V2X communication.

According to one aspect, the first set of resources may be included in a third set of resources allocated for P2V communication, and the first set of resources may include the last symbol of the third set of resources. In such an aspect, the third set of resources may further include a gap symbol consecutively preceding the last symbol, and the gap symbol may allow the PUE 104 to transition from a transmitting mode to a receiving mode (e.g., the PUE 104 may reduce power to a transmitter and increase power to a receiver and/or the PUE 104 may close one or more transmit chains and open one or more receive chains).

According to another aspect, the first set of resources may be included in a fourth set of resources that is allocated for a PSFCH. In such an aspect, the third set of resources allocated for P2V communication may precede the fourth set of resources, and may be separated from the fourth set of resources by a set of slots that is unmonitored by the PUE 104.

Correspondingly, the PUE 104 may be configured to monitor the first set of resources to detect the paging indicator 198 indicating the paging message 199 is carried on a second set of resources allocated for V2P communication consecutive to the first set of resources. When the PUE 104 detects the paging indicator 198, the PUE 104 may be configured to decode information on the second set of resources to detect the paging message 199 from the VUE 104'. In some aspects, the PUE 104 may decode information on each symbol over each sub-channel of the second set of resources allocated for the V2P communication in order to detect the paging message 199.

When the PUE 104 does not detect the paging indicator 198 (e.g., when the VUE 104' does not transmit a paging indicator 198), then the PUE may be configured to refrain from decoding information on the second set of resources. For example, the PUE 104 may be configured to transition to a low-power state from a high-power state when the PUE 104 does not detect the paging indicator 198, and the PUE 104 may operate in the high-power state when monitoring the first set of resources.

In some further aspects, the PUE 104 may be configured to transmit information 197 associated with P2V communication on the third set of resources, which may be dedicated to P2V communication—e.g., the third set of resources may be dedicated to P2V communication in that only P2V communication may be carried on the third set of resources. Accordingly, the third set of resources may be non-overlapping with the second set of resources, which may be non-dedicated to V2P communication. Correspondingly, the VUE 104' may be configured to receive, from the PUE 104, the information 197 associated with P2V communication on the third set or resources dedicated to P2V communication.

According to various aspects, one or more of the aforementioned first, second, third, and/or fourth sets of resources may include time resources, frequency resources, code resources, and/or any combination thereof.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
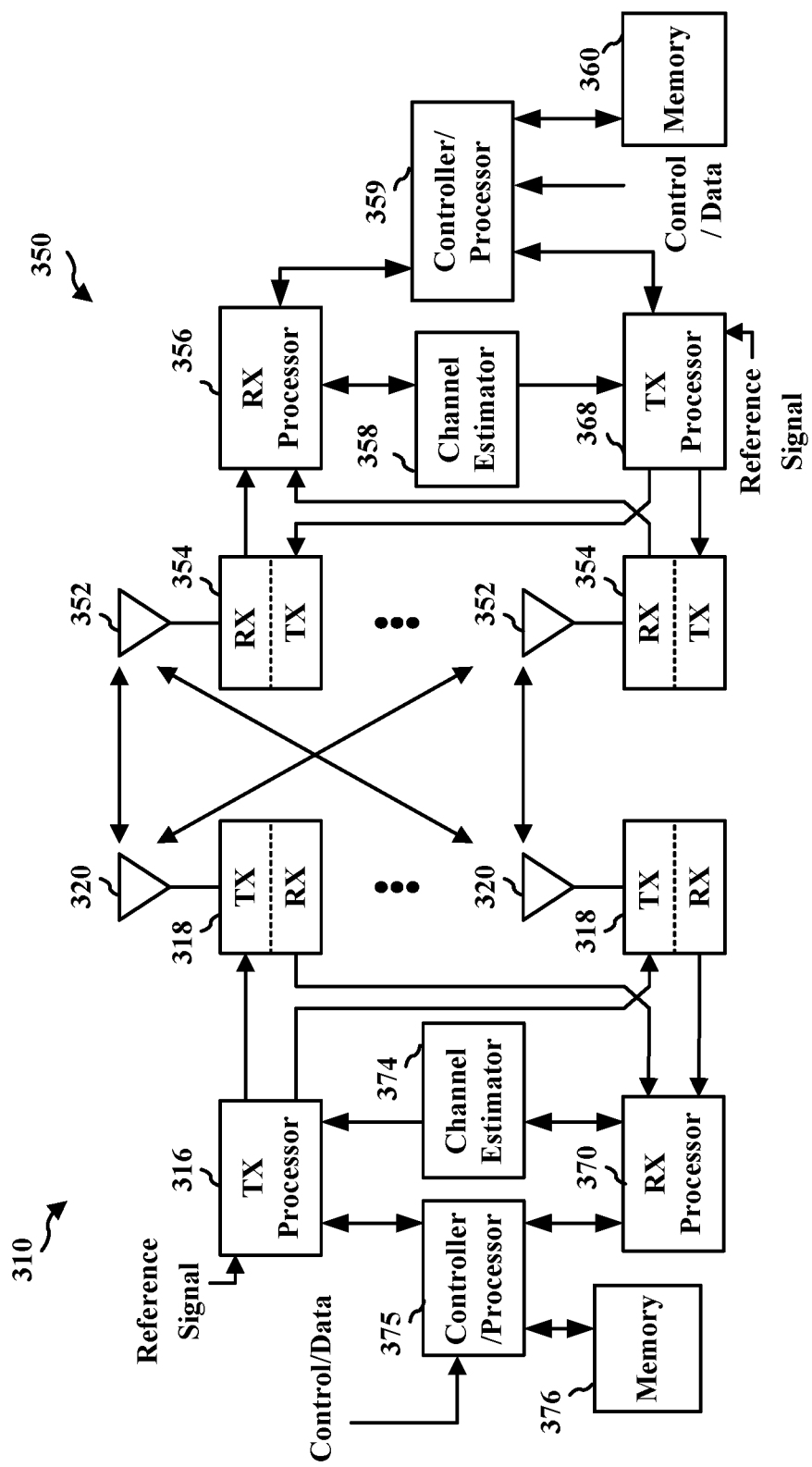
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In various aspects, each of the PUE 104 and/or the VUE 104' of FIG. 1 may be implemented as the UE 350. Accordingly, at least one of the TX processor 368, the RX processor 356, and the controller/processor 359 may be configured to perform aspects in connection with the P2V information 197, the V2P paging indicator 198, and/or the V2P paging message 199 of FIG. 1.

As described, supra, V2P communication may refer to communication transmitted from a UE associated with a vehicle (also referred to as a VUE) to another UE associated with a pedestrian (also referred to as a PUE). Correspondingly, P2V communication may refer to communication transmitted from a PUE to a VUE.

V2P communication may be used for pedestrian safety. For example, V2P communication may be used by a VUE to notify a PUE that the two are on a collision course. Further, P2V communication may further contribute to pedestrian and/or vehicular safety. For example, P2V communication may be used by a PUE to notify a VUE of a PUE position and/or anticipated route of travel.

In some aspects, one or both of V2P and/or P2V communications may be relatively infrequency. However, one or both of V2P and/or P2V communications may still rely on relatively low latency in order to contribute to pedestrian and/or vehicular safety. In addition, PUEs may be subject to some power constraints and, therefore, may be unable to continuously monitor for V2P communication. Accordingly, a need exists for efficient and reliable approaches and solutions to V2P and/or P2V communications.

The present disclosure provides various approaches and solutions to resource allocation for PUEs and VUEs. For example, the present disclosure describes various approaches and solutions to resource allocation for VUEs to notify PUEs that consider safety (e.g., low latency and reliability) and power consumption (e.g., by PUEs).

Figure 4:
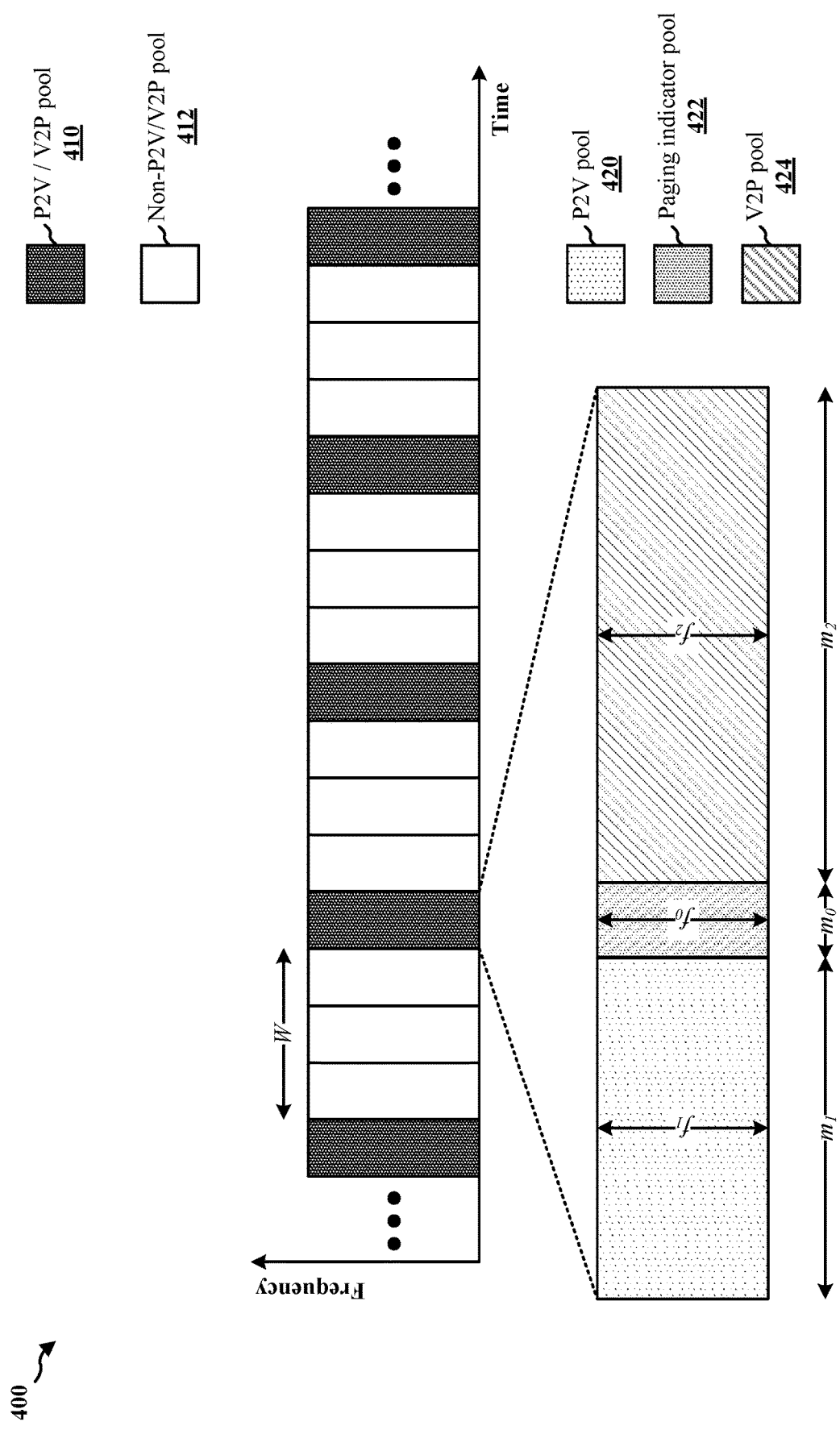
FIG. 4 is a diagram of an example resource allocation in an access network.

FIG. 4 is a diagram illustrating an example resource allocation 400 in an access network. In the example resource allocation 400, pools 410 of resources allocated for one or both of P2V and/or V2P communications may be multiplexed (e.g., time-division multiplexed) with other pools 412 of resources that are not allocated for either P2V or V2P communications. For example, a P2V/V2P pool 410 may include a set of one or more slots that occurs every W slots of the non-P2V/V2P pool 412. In one aspect, W may be preconfigured (e.g., defined by one or more standards and/or technical specifications, such as those promulgated by 3GPP). In another aspect, W may be configured by a base station, such as a gNB or other macro base station (e.g., the base station 102/180 of FIG. 1), and may be signaled to PUEs and/or VUEs operating within the coverage area of the base station.

Within the P2V/V2P pool 410, resources may be allocated between P2V communication and V2P communication. For example, the P2V/V2P pool 410 may include a P2V pool 420, a paging indicator pool 422, and a V2P pool 424. Each of the P2V pool 420, the paging indicator pool 422, and the V2P pool 424 may include time resources, frequency resources, code resources, and/or any combination thereof.

In some aspects, a P2V pool 420 may occupy the first $m_1$ slots of the P2V/V2P pool 410 in the time domain. In the frequency domain, the P2V pool 420 may span $f_1$ sub-channels. The $f_1$ sub-channels may be contiguous (e.g., as illustrated), non-contiguous, or a combination of some contiguous and some non-contiguous sub-channels.

The P2V pool 420 may be dedicated to P2V communication in which PUEs are allowed to transmit to VUEs. Consequently, other types of communication, such as V2X and V2P communications, may be prohibited during the P2V pool 420. For example, referring to FIG. 1, the PUE 104 may transmit P2V information 197 to the VUE 104' on one or more of the $f_1$ sub-channels over at least a portion of one or more of the $m_1$ slots. The P2V information 197 may include data and/or control information associated with P2V communication. The VUE 104' may receive the P2V information 197 by decoding all or a subset of the symbols of the m slots over all or a subset of the $f_1$ sub-channels.

In one aspect, the PUE 104 may perform carrier sensing in order to transmit the P2V information 197. That is, the PUE 104 may first determine that the one or more of the $f_1$ sub-channels on which the PUE 104 is to transmit the P2V information 197 are unoccupied, e.g., by other P2V communication signaling. If the PUE 104 determines that the one or more of the $f_1$ sub-channels on which the PUE 104 is to transmit the P2V information 197 are unoccupied, then the PUE 104 may transmit the P2V information 197 on those one or more of the $f_1$ sub-channels that are determined to be unoccupied. However, if the PUE 104 determines that the one or more of the $f_1$ sub-channels on which the PUE 104 is to transmit the P2V information 197 are occupied, then the PUE 104 may refrain from transmitting and may wait (e.g., a preconfigured time period) before performing carrier sensing again and/or the PUE 104 may select a different set of the $f_1$ sub-channels on which to perform carrier sensing.

In another aspect, the PUE 104 may randomly (or pseudo-randomly) select one or more of the $f_1$ sub-channels on which to transmit the P2V information 197. The PUE 104 may then transmit the P2V information 197 on those randomly (or pseudo-randomly) selected one or more of the $f_1$ sub-channels.

Following the $m_1$ slots, a pool 422 may be allocated for a paging indicator (e.g., the paging indicator 198 of FIG. 1). The paging indicator pool 422 may occupy $m_0$ symbols spanning $f_0$ PRBs in a slot. The $f_0$ PRBs may include sub-channels that are contiguous (e.g., as illustrated), non-contiguous, or a combination of some contiguous and some non-contiguous sub-channels. Further, the $f_0$ PRBs may include the same sub-channels as the $f_1$ sub-channels (e.g., as illustrated), or the $f_0$ PRBs may include a set of sub-channels that overlaps with the $f_1$ sub-channels as well as a set over non-overlapping sub-channels, or the $f_0$ PRBs may include a set of sub-channels that is entirely non-overlapping with the $f_1$ sub-channels.

In some aspects, the $m_0$ symbols may be one (1) symbol. In other aspects, the $m_0$ symbols may include more than one symbol. In still further aspects, the $m_0$ symbols may be a portion of a symbol, such as a half of a symbol.

The paging indicator pool 422 may be dedicated to a paging indicator associated with V2P communication. Consequently, other types of communication, including P2V communication and non-paging indicator V2P communication, may be prohibited during the paging indicator pool 422. For example, referring to FIG. 1, the VUE 104' may transmit a paging indicator 198 on the $f_0$ PRBs (over the $m_0$ symbols) when the VUE 104' has a paging message 199 to transmit to the PUE 104.

The paging indicator pool 422 may be consecutively followed in the time domain by $m_2$ slots of a V2P pool 424. In the time domain, the $m_1$ slots of the P2V pool 420, the $m_0$ symbols of the paging indicator pool 422, and the $m_2$ slots of the V2P pool 424 may be non-overlapping.

The V2P pool 424 may span $f_2$ sub-channels in the frequency domain. The $f_2$ sub-channels may be contiguous (e.g., as illustrated), non-contiguous, or a combination of some contiguous and some non-contiguous sub-channels.

Potentially, the $f_2$ sub-channels may span the entire available system bandwidth. Further, the $f_2$ sub-channels may include the same sub-channels as the $f_1$ sub-channels (e.g., as illustrated), or may include a set of sub-channels that overlaps with the $f_1$ sub-channels as well as a set over non-overlapping sub-channels, or the $f_2$ sub-channels may include a set of sub-channels that is entirely non-overlapping with the $f_1$ sub-channels.

The V2P pool 424 may be non-dedicated to V2P communication in which VUEs are allowed to transmit to PUEs. Therefore, other types of communication, such as V2X or other P2V communications, may be allowed during the V2P pool 424. For example, referring to FIG. 1, the VUE 104' may transmit a V2P paging message 199 to the PUE 104 on one or more of the $f_2$ sub-channels over at least a portion of one or more of the $m_2$ slots.

According to some aspects, one or more of the aforementioned $m_0$, $m_1$, $m_2$, $f_0$, $f_1$, and/or $f_2$ may be preconfigured. For example, $m_0$, $m_1$, $m_2$, $f_0$, $f_1$, and/or $f_2$ defined by one or more standards and/or technical specifications, such as those promulgated by 3GPP. According to some other aspects, $m_0$, $m_1$, $m_2$, $f_0$, $f_1$, and/or $f_2$ may be configured by a base station, such as a gNB or other macro base station (e.g., the base station 102/180 of FIG. 1), and may be signaled to PUEs and/or VUEs operating within the coverage area of the base station.

In the context of FIG. 1, the VUE 104' may determine whether the paging message 199 is to be transmitted to the PUE 104. For example, the VUE 104' may determine that the VUE 104' and the PUE 104 are on a collision course and, therefore, may determine that the VUE 104' should transmit the paging message 199 to the PUE 104, e.g., in order to inform the PUE 104 of the collision course. When the VUE 104' determines that the VUE 104' should transmit the paging message 199 to the PUE 104, the VUE 104' may generate the paging indicator 198.

The VUE 104' may generate the paging indicator 198 based on a sequence. In one aspect, the VUE 104' may generate the paging indicator 198 based on a common sequence, such as a sequence that is generally known to PUEs. The VUE 104' may generate the paging indicator 198 based on the common sequence when the paging message is intended for all PUEs and/or is intended for any PUE within the transmission coverage area of the VUE 104'.

In another aspect, the VUE 104' may generate the paging indicator 198 based on a specific sequence, such as a sequence that is based on information identifying the PUE 104. The VUE 104' may generate the paging indicator 198 based on the specific sequence when the paging message 199 is intended for a specific UE (e.g., the PUE 104). By generating the paging indicator 198 based on the specific sequence, the VUE 104' may indicate that the paging indicator 198, as well as the subsequent paging message 199, is intended for the PUE specifically identified by the specific sequence.

The VUE 104' may then transmit the paging indicator 198 in the paging indicator pool 422. In other words, the VUE 104' may transmit the paging indicator 198 on the $f_0$ PRBs (over the $m_0$ symbols). However, when the VUE 104' determines that the VUE 104' has no paging message to transmit, then the VUE 104' may refrain from transmitting the paging indicator 198, and therefore, the resources of the paging indicator pool 422 may be empty and unoccupied of V2P-associated communications. Though the paging indicator pool 422 may be empty, and the associated V2P communication may be present, the V2P pool resources 424 having $m_2$ slots of $f_2$ subchannels may be used for communication between vehicles, such as which vehicle-to-vehicle (V2V) communication.

When the VUE 104' determines that the VUE 104' has a paging message 199 to transmit and subsequently transmits the paging indicator 198, the VUE 104' may generate the paging message 199. The V2P paging message 199 may include data and/or control information associated with V2P communication. For example, the paging message 199 may inform the PUE 104 of safety-related information, such as a potential collision course between the VUE 104' and the PUE 104. The VUE 104' may then transmit the generated paging message 199 on one or more of the $f_2$ sub-channels over at least a portion of one or more of the $m_2$ slots.

Correspondingly, the PUE 104 may be configured to monitor the paging indicator pool 422 at each occurrence. For example, the PUE 104 may operate in a relatively higher-power or "awake" state in order to receive and decode the $m_0$ symbols (over the $f_0$ PRBs). When the PUE 104 detects the paging indicator 198 in the paging indicator pool 422, the PUE 104 may remain in the higher-power/awake state for the $m_2$ slots. The PUE 104 may then decode information on each symbol of the $m_2$ slots over each of the $f_2$ sub-channels. For example, the PUE 104 may receive and decode all resources of the V2P pool 424 when the PUE 104 detects the paging indicator 198 because multiple VUEs may be transmitting paging messages, and so the PUE 104 may attempt to detect each of the multiple paging messages.

The PUE 104 may perform a set of operations associated with the paging message 199 when the PUE 104 receives and decodes the paging message 199. For example, the PUE 104 may provide an alert to the pedestrian associated with the PUE 104, such as an audio, visual, and/or tactile alert informing the pedestrian of the potential collision course with the VUE 104'.

However, when the PUE 104 does not detect the paging indicator 198 in the paging indicator pool 422, the PUE 104 may refrain from receiving and decoding any resources of the V2P pool 424. However, V2V communications may still take place in the V2P pool 424. For example, the PUE 104 may transition from the higher-power/awake state to a relatively lower-power or "sleep" state, which may conserve some power of the PUE 104.

Figure 5:
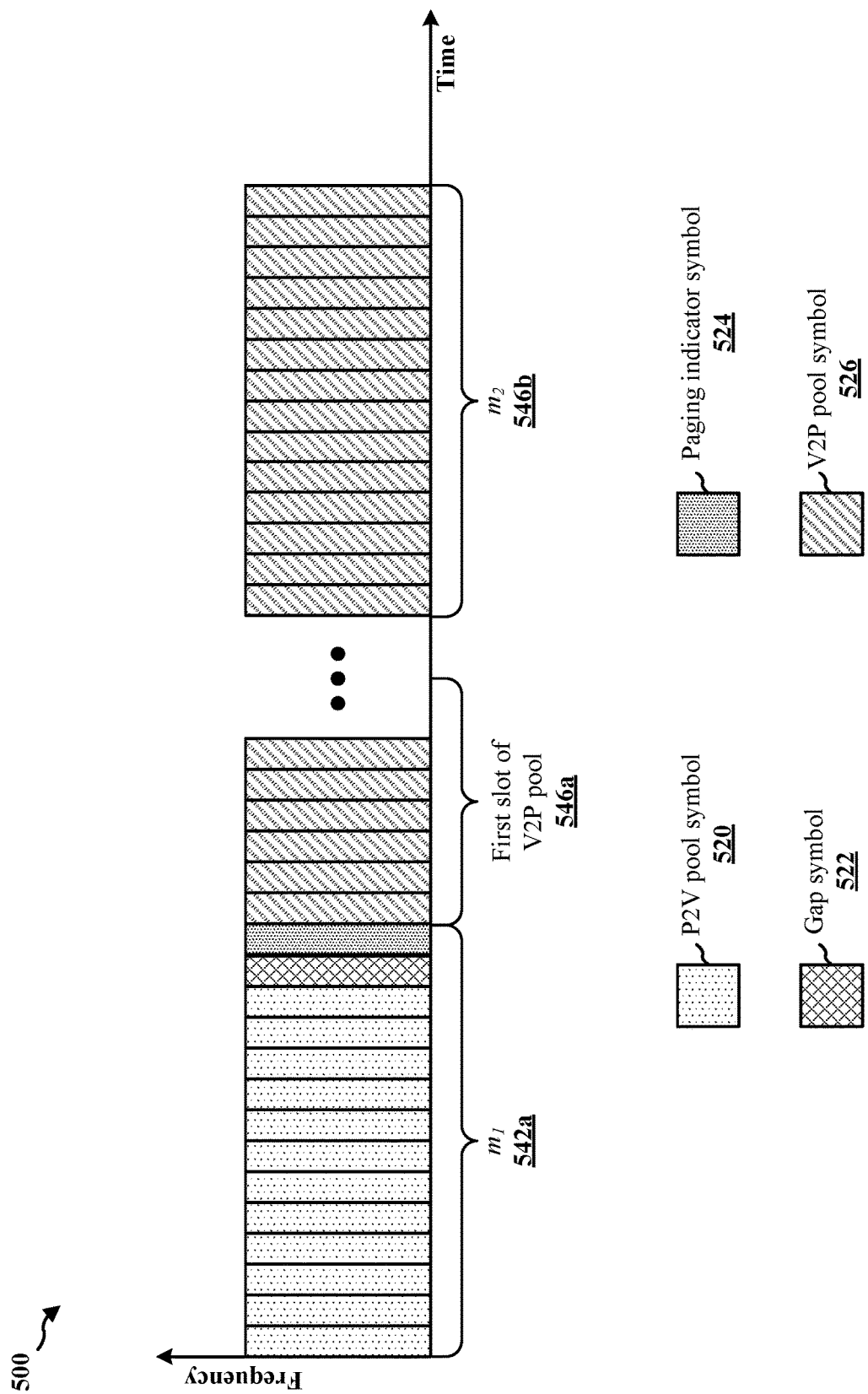
FIG. 5 is a diagram of another example resource allocation in an access network.

Referring to FIG. 5, a diagram illustrates an example resource allocation 500 for P2V/V2P communications. In the example resource allocation 500, the $m_0$ symbols of the paging indicator pool 422 may be allocated from the P2V pool 420 in the time domain. As illustrated, the paging indicator may be allocated on at least one symbol 524 of the last slot $m_1$ 542a of the P2V pool 420. For example, depending upon the configured numerology, the paging indicator symbol 524 may be allocated to occupy at least the fourteenth symbol of the last slot $m_1$ 542a of the P2V pool 420.

When the paging indicator symbol 524 is allocated to occupy at least the last symbol of the last slot $m_1$ 542a of the P2V pool 420, at least one symbol consecutively preceding the allocated paging indicator symbol 524 may be configured as a gap symbol 522. For example, depending upon the configured numerology, the gap symbol 522 may be allocated to occupy the thirteenth symbol of the last slot $m_1$ 542a of the P2V pool 420. Consequently, the number of P2V pool symbols 520 of the last slot $m_1$ 542a may be reduced by the gap symbol 522 and the paging indicator symbol 524 (e.g., reduced by two when the $m_0$ symbols of the paging indicator pool 422 is one).

The gap symbol 522 may allow the PUE 104 to transition from a transmitting mode to a receiving mode. For example, the PUE 104 may reduce power to a transmitter and increase power to a receiver and/or the PUE 104 may close one or more transmit chains and open one or more receive chains during the gap symbol 522. In some instances, the gap symbol 522 may additionally allow the VUE 104' to transition from a receiving mode to a transmitting mode. For example, the VUE 104' may increase power to a transmitter and reduce power to a receiver and/or the VUE 104' may close one or more receive chains and open one or more transmit chains during the gap symbol 522.

The first slot 546a of the V2P pool 424 may consecutively follow the paging indicator symbol 524 in the time domain. Accordingly, the V2P pool symbols 526 may consecutively occupy the next $m_2$ slots in the time domain until the last slot $m_2$ 546b of the V2P pool 424 occurs in the time domain. Thus, my slots of the P2V pool 420, the gap symbol 522, the $m_0$ symbols of the paging indicator pool 422, and the V2P pool 424 may be non-overlapping and consecutive in time according to the example resource allocation 500.

Figure 6:
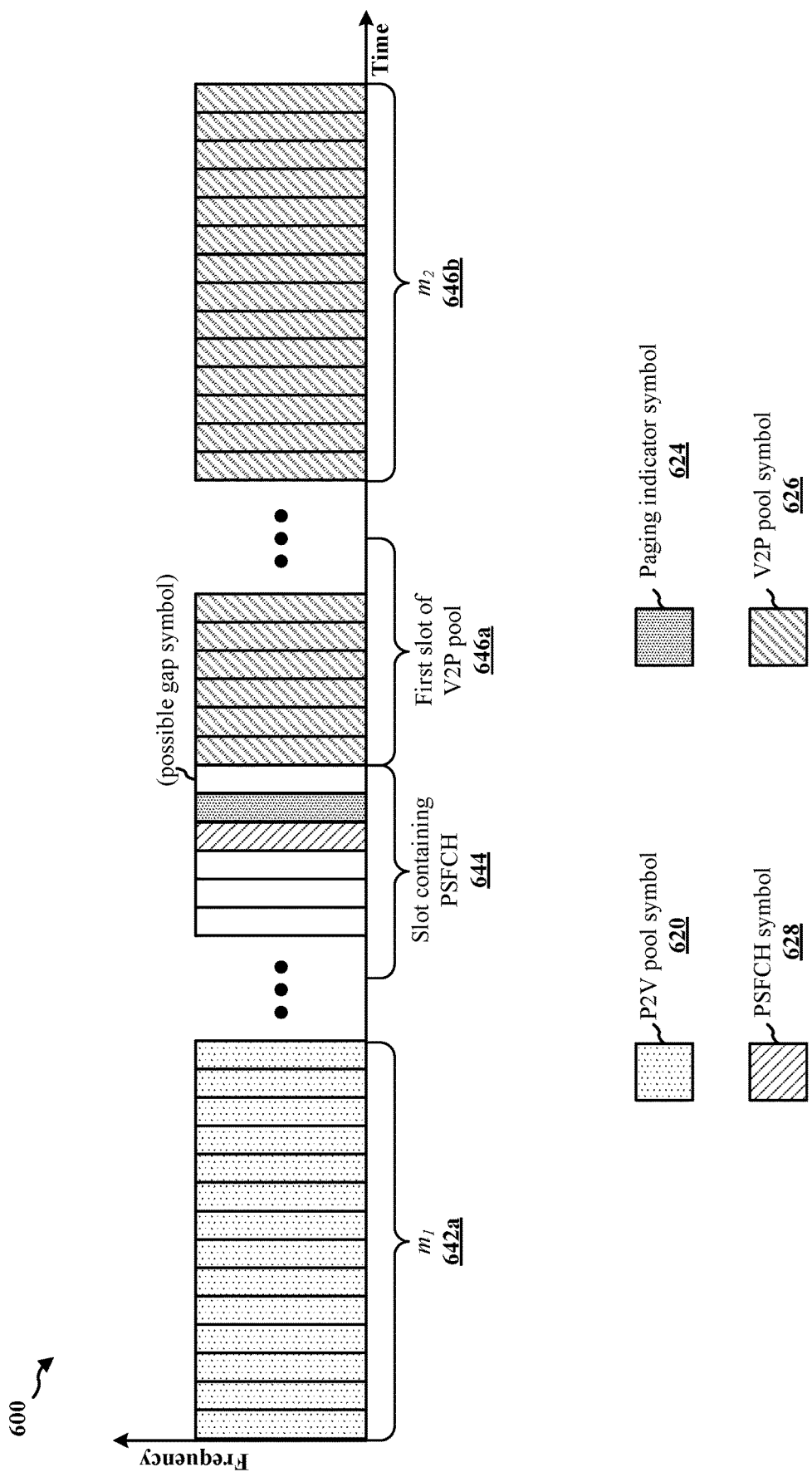
FIG. 6 is a diagram of a further example resource allocation in an access network.

Referring to FIG. 6, a diagram illustrates another example resource allocation 600 for P2V/V2P communications. In the example resource allocation 600, the $m_0$ symbols of the paging indicator pool 422 may be allocated from a slot 644 containing a PSFCH in the time domain. The PSFCH symbols 628 may be configured on the last two symbols (e.g., symbol index 12 and symbol index 13) of every N slots (e.g., 1, 2, or 4 slots).

As illustrated, the paging indicator may be allocated on at least one symbol 624 of the slot 644 containing the PSFCH, and may be allocated from one or more of the symbols 628 allocated for the PSFCH. For example, depending upon the configured numerology, the paging indicator symbol 624 may be allocated to occupy at least the thirteenth symbol (e.g., symbol index 12) of the slot 644 containing the PSFCH, and therefore, may be consecutively preceded by at least one PSFCH symbol 628.

As the paging indicator symbol 624 may not be allocated from the last slot $m_1$ 642a of the P2V pool 420, the number of P2V pool symbols 620 may remain unreduced. Furthermore, a gap symbol may be unnecessary, as the PUE 104 may be able to transition from a transmitting mode to a receiving mode during the slot 644 containing the PSFCH and/or one or more other slots separating the last slot my 642a of the P2V pool 420 from the slot 644 containing the PSFCH. For example, the PUE 104 may refrain from monitoring (e.g., receiving and decoding) the slot 644 containing the PSFCH (as well as one or more intermediary slots consecutively following the last slot $m_1$ 642a of the P2V pool 420), with the exception of the paging indicator symbol 624 (and, potentially, the PSFCH symbol 628).

In some instances, the VUE 104' may be able to transition from a receiving mode to a transmitting mode during the slot 644 containing the PSFCH, as well. The VUE 104' may transmit the paging indicator 198 in one or more PRBs in the PSFCH symbol(s) 628, as at least one of the PSFCH symbol(s) 628 may be allocated as a paging indicator symbol 624.

The first slot 646a of the V2P pool 424 may consecutively follow the PSFCH slot 644 in the time domain. Accordingly, the V2P pool symbols 626 may consecutively occupy the next $m_2$ slots in the time domain until the last slot $m_2$ 646b of the V2P pool 424 occurs in the time domain. Thus, my slots of the P2V pool 420 may be non-overlapping and non-consecutive in time with the $m_0$ symbols of the paging indicator pool 422 and the V2P pool 424, which may be non-overlapping but may or may not be consecutive in time depending on whether there is a gap symbol after the PSFCH symbol 628 configured for V2P.

Figure 7:
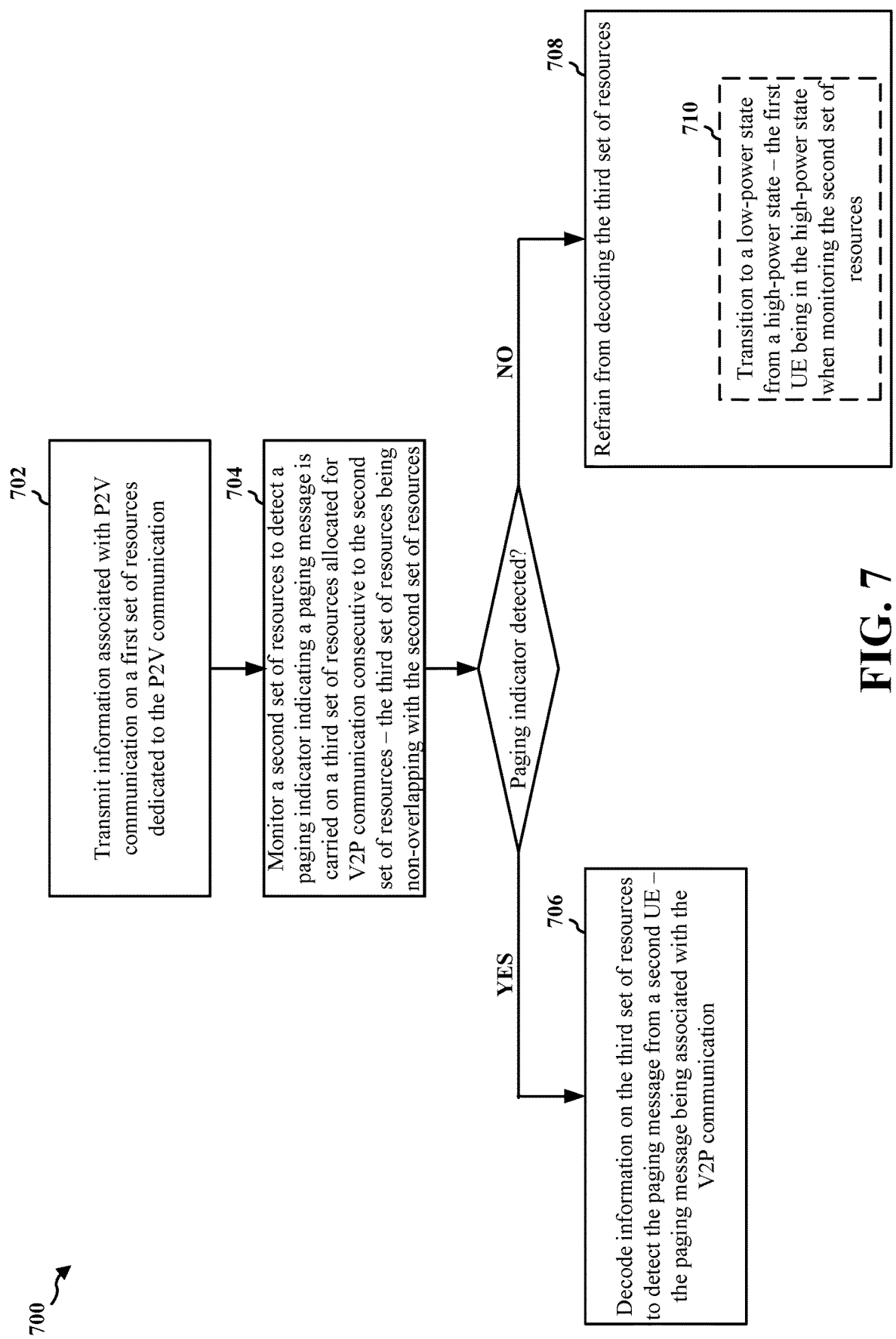
FIG. 7 is a flowchart of a method of wireless communication by a UE associated with a pedestrian.

FIG. 7 is a flowchart of a method 700 of wireless communication. The method 700 may be performed by a first UE (e.g., the PUE 104/UE 350, which may include the memory 360 and which may be the entire PUE 104/UE 350 or a component of the PUE 104/UE 350, such as the TX processor 368, the RX processor 356, and/or the controller/processor 359).

At 702, the first UE may transmit information associated with P2V communication on a first set of resources dedicated to the P2V communication. For example, the first UE may perform carrier sensing on or may (pseudo-) randomly select one or more resources of a P2V pool, and the first UE may transmit information associated with P2V communication on the selected one or more resources of the P2V dedicated pool. In the context of FIGS. 1 and 4, the PUE 104 may transmit the P2V information 197 to the VUE 104' on the resources of the P2V pool 420. Referring to FIGS. 5-6, the PUE 104 may transmit the P2V information 197 on the last slot $m_1$ 542a, 642a of the P2V pool 420.

At 704, the first UE may monitor a second set of resources to detect a paging indicator indicating a paging message is carried on a third set of resources allocated for V2P communication consecutive to the second set of resources. The third set of resources may be non-overlapping with both the first set of resources and the second set of resources. The paging indicator may include or may be based on one of a common sequence or a sequence that is based on information identifying the first UE. In the context of FIGS. 1 and 4, the PUE 104 may monitor the resources of the paging indicator pool 422 to detect the paging indicator 198 indicating the paging message 199 is carried on the resources of the V2P pool 424 consecutive in time to the paging indicator pool 422.

In one aspect, the second set of resources may be included in the first set of resources allocated for P2V communication, and the second set of resources may include the last symbol of the first set of resources. In such an aspect, the first set of resources may further include a gap symbol that consecutively precedes the last symbol in time. Referring to FIG. 5, the PUE 104 may monitor the paging indicator symbol 524, which may occupy the last symbol of the last slot $m_1$ 542a of the P2V pool 420.

In another aspect, the second set of resources may be included in a fourth set of resources allocated for a PSFCH. In such an aspect, the first set of resources allocated for P2V communication may precede the fourth set of resources in time and may be separated from the first set of resources allocated for P2V communication by a set of slots that is unmonitored by the first UE. Referring to FIG. 6, the PUE 104 may monitor the paging indicator symbol 624, which may be allocated from PSFCH symbols 628 in a slot 644 containing the PSFCH symbols 628. The PUE 104 may refrain from monitoring the slot 644 containing the PSFCH symbols 628, with the exception of the paging indicator symbol 624.

At 706, the first UE may decode information on the third set of resources to detect the paging message from a second UE when the paging indicator is detected on the second set of resources. The paging message may be associated with V2P communication. The first UE may decode information on each symbol over each sub-channel of the third set of resources allocated for the V2P communication, e.g., in order to detect any paging messages transmitted by any second UE. In the context of FIGS. 1 and 4, the PUE 104 may decode the resources of the V2P pool 424 to detect the paging message 199 from the VUE 104' when the paging indicator 198 is detected on the resources of the paging indicator pool 422. Referring to FIGS. 5-6, the PUE 104 may decode the slots 546a-b, 646a-b of the V2P pool 424 to detect the paging message 199 from the VUE 104' when the paging indicator 198 is detected on the paging indicator symbol 524, 624.

At 708, the first UE may refrain from decoding the third set of resources when the paging indicator is undetected on the second set of resources. For example, at 710, the first UE may transition to a low-power state from a high-power state when the paging indicator is undetected on the second set of resources, and the first UE may be in the high-power state when monitoring the second set of resources. In the context of FIGS. 1 and 4, the PUE 104 may refrain from decoding the resources of the V2P pool 424 when the paging indicator 198 is undetected on the resources of the paging indicator pool 422. Referring to FIGS. 5-6, the PUE 104 may refrain from decoding the slots 546a-b, 646a-b of the V2P pool 424 when the paging indicator 198 is undetected on the paging indicator symbol 524, 624.

Figure 8:
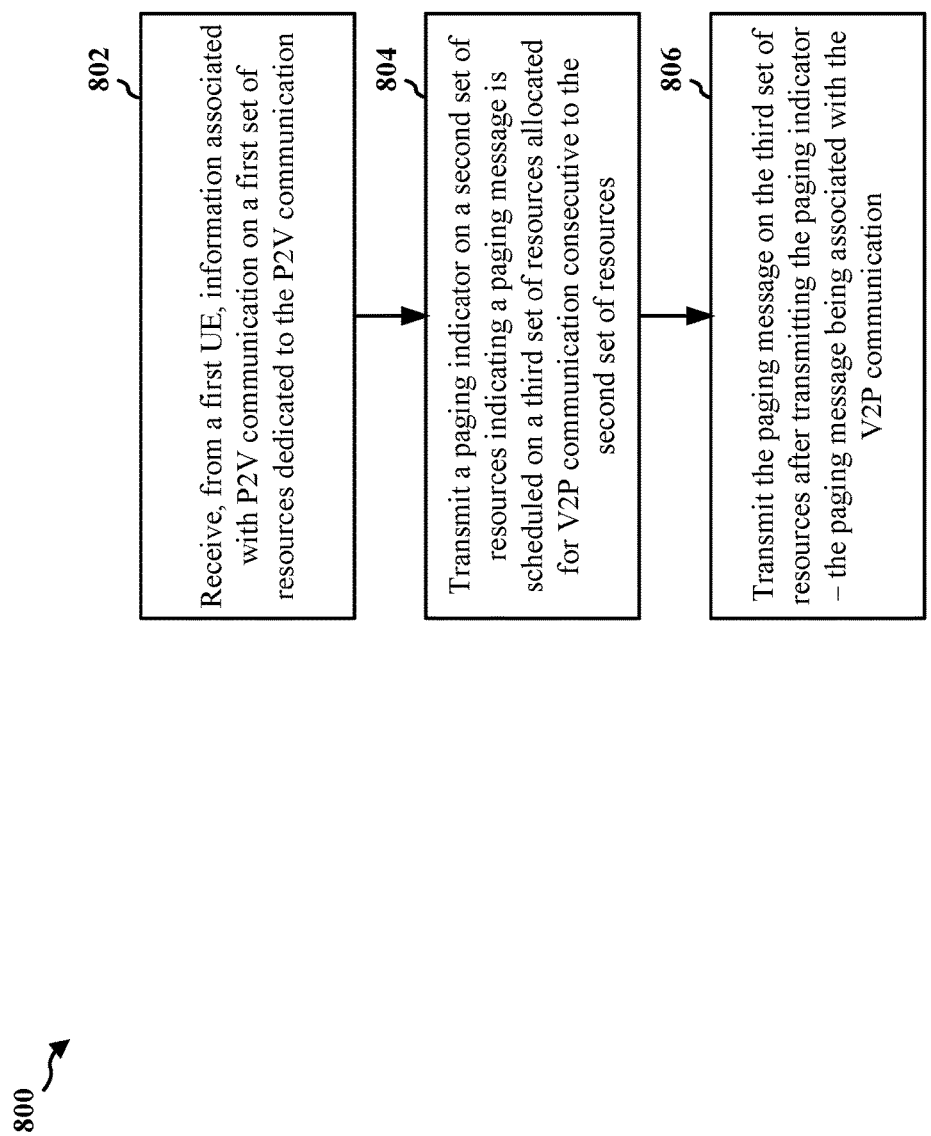
FIG. 8 is a flowchart of a method of wireless communication by a UE associated with a vehicle.

FIG. 8 is a flowchart of a method 800 of wireless communication. The method 800 may be performed by a second UE (e.g., the VUE 104'/UE 350, which may include the memory 360 and which may be the entire VUE 104'/UE 350 or a component of the VUE 104'/UE 350, such as the TX processor 368, the RX processor 356, and/or the controller/processor 359).

At 802, the second UE may receive, from a first UE, information associated with P2V communication on a first set of resources dedicated to the P2V communication. In the context of FIGS. 1 and 4, the VUE 104' may receive, from the PUE 104, the P2V information 197 from the PUE 104 on the resources of the P2V pool 420. Referring to FIGS. 5-6, the VUE 104' may receive, from the PUE 104, the P2V information 197 on the last slot $m_1$ 542a, 642a of the P2P pool 420.

At 804, the second UE may transmit a paging indicator on a second set of resources to indicate a paging message is scheduled on a third set of resources allocated for V2P communication consecutive to the second set of resources. The third set of resources may be non-overlapping with both the first set of resources and the second set of resources. The paging indicator may include or may be based on one of a common sequence or a sequence that is based on information identifying the first UE. In the context of FIGS. 1 and 4, the VUE 104' may transmit the paging indicator 198 on the resources of the paging indicator pool 422 to indicate the paging message 199 is carried on the resources of the V2P pool 424 consecutive in time to the paging indicator pool 422.

In one aspect, the second set of resources may be included in the first set of resources allocated for P2V communication, and the second set of resources may include the last symbol of the first set of resources. In such an aspect, the first set of resources may further include a gap symbol that consecutively precedes the last symbol in time. Referring to FIG. 5, the VUE 104' may transmit the paging indicator 198 on the paging indicator symbol 524, which may occupy the last symbol of the last slot $m_1$ 542a of the P2V pool 420.

In another aspect, the second set of resources may be included in a fourth set of resources allocated for a PSFCH. In such an aspect, the first set of resources allocated for P2V communication may precede the fourth set of resources in time and may be separated from the first set of resources allocated for P2V communication by a set of slots that is unmonitored by the first UE. Referring to FIG. 6, the VUE 104' may transmit the paging indicator 198 on the paging indicator symbol 624, which may be allocated from PSFCH symbols 628 in a slot 644 containing the PSFCH symbols 628.

At 806, the second UE may transmit the paging message on the third set of resources after transmitting the paging indicator on the second set of resources. The paging message may be associated with V2P communication. In the context of FIGS. 1 and 4, the VUE 104' may transmit the paging message 199 on the resources of the V2P pool 424 after transmitting the paging indicator 198. Referring to FIGS. 5-6, the VUE 104' may transmit the paging message 199 on the slots 546a-b, 646a-b of the V2P pool 424 after transmitting the paging indicator 198 on the paging indicator symbol 524, 624.

Figure 9:
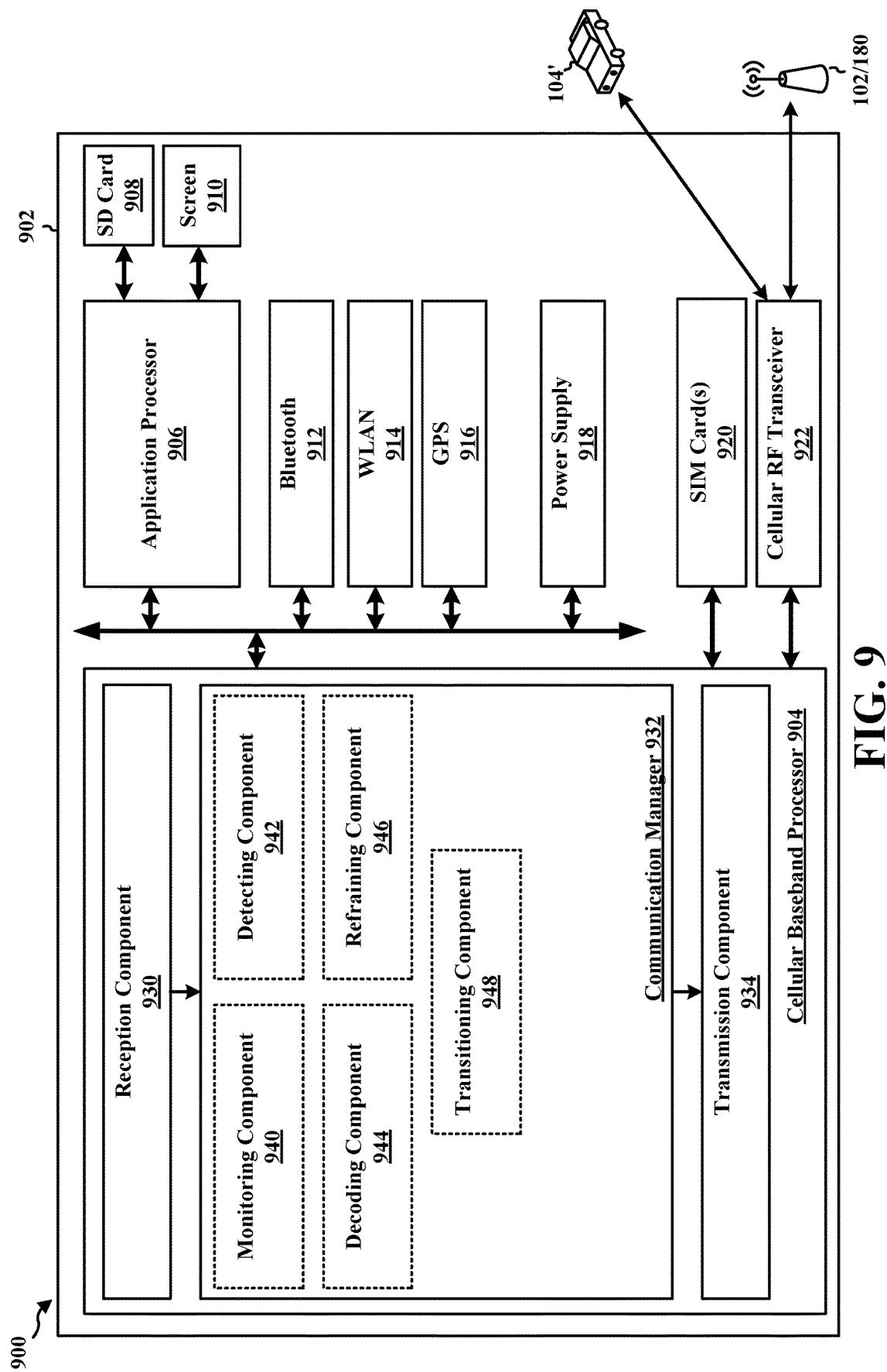
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or base station 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., the UE 350 of FIG. 3) and include the aforediscussed additional modules of the apparatus 902.

In some aspects, the transmission component 934 may be configured to transmit information associated with P2V communication on a first set of resources dedicated to P2V communications, e.g., as described in connection with 702 of FIG. 7.

The communication manager 932 may include a monitoring component 940 that is configured to monitor a second set of resources to detect a paging indicator indicating a paging message is carried on a third set of resources allocated for V2P communication consecutive to the second set of resources—the third set of resources being non-overlapping with the second set of resources, e.g., as described in connection with 704 of FIG. 7.

The communication manager 932 may further include a detecting component 942 that may receive input from the monitoring component 940 and may be configured to detect, on the second set of resources, a paging indicator indicating a paging message is carried on the third set of resources allocated for V2P communication consecutive to the second set of resources.

The detecting component 942 may provide information to one or more other components of the communication manager 932, such as a decoding component 944, refraining component 946, and/or a transitioning component 948, e.g., based on whether the paging indicator is detected.

When the paging indicator is detected, the decoding component 944 may be configured to decode information on the third set of resources to detect the paging message, which may be associated with the V2P communication, e.g., as described in connection with 706 of FIG. 7.

When the paging indicator is detected, the refraining component 946 may be configured to refrain from decoding information on the third set of resources to detect the paging message, which may be associated with the V2P communication, e.g., as described in connection with 708 of FIG. 7. In some aspects, the transitioning component 948 may then transition one or more components of the apparatus 902 to a low-power state from a high-power state, as the apparatus 902 may be in the high-power state when monitoring resources, e.g., as described in connection with 710 of FIG. 7.

The apparatus 902 may include additional components that perform some or all of the blocks, operations, signaling, etc. of the algorithm(s) in the aforementioned flowchart of FIG. 7. As such, some or all of the blocks, operations, signaling, etc. in the aforementioned flowchart of FIG. 7 may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for monitoring a first set of resources to detect a paging indicator indicating a paging message is carried on a second set of resources allocated for V2P communication consecutive in time to the first set of resources; means for decoding information on the second set of resources to detect the paging message from a second UE when the paging indicator is detected, the paging message being associated with the V2P communication; and means for refraining from decoding the information on the second set of resources when the paging indicator is undetected.

In some aspects, the first set of resources is included in a third set of resources allocated for P2V communication, and the first set of resources includes a last symbol of the third set of resources.

In one aspect, the third set of resources includes a gap symbol consecutively preceding the last symbol.

In one aspect, the first set of resources is included in a third set of resources allocated for a PSFCH.

In one aspect, a fourth set of resources allocated for P2V communication and preceding the third set of resources in time is separated from the third set of resources by a set of slots that is unmonitored by the apparatus 902.

In one aspect, the paging indicator includes one of a common sequence or a sequence that is based on information identifying the apparatus 902.

In one configuration, the apparatus 902, and in particular the cellular baseband processor 904, may further include means for transmitting information associated with P2V communication on a third set of resources dedicated to the P2V communication, and the third set of resources does not overlap in time with the second set of resources.

In one aspect, the information associated with the P2V communication is transmitted on the third set of resources based on one of random selection or carrier sensing.

In one aspect, the second set of resources is non-dedicated to the V2P communication such that other types of communication are allowed, and the third set of resources is dedicated to the P2V communication such that other types of communication are prohibited.

In one aspect, information on each symbol over each sub-channel of the second set of resources allocated for the V2P communication is decoded.

In one aspect, the means for refraining from decoding the information on the second set of resources when the paging indicator is undetected is configured to: transition to a low-power state from a high-power state, the apparatus 902 being in the high-power state when monitoring the first set of resources.

In one aspect, the first and the second set of resources each include a set of time resources, a set of frequency resources, a set of code resources, or any combination thereof.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
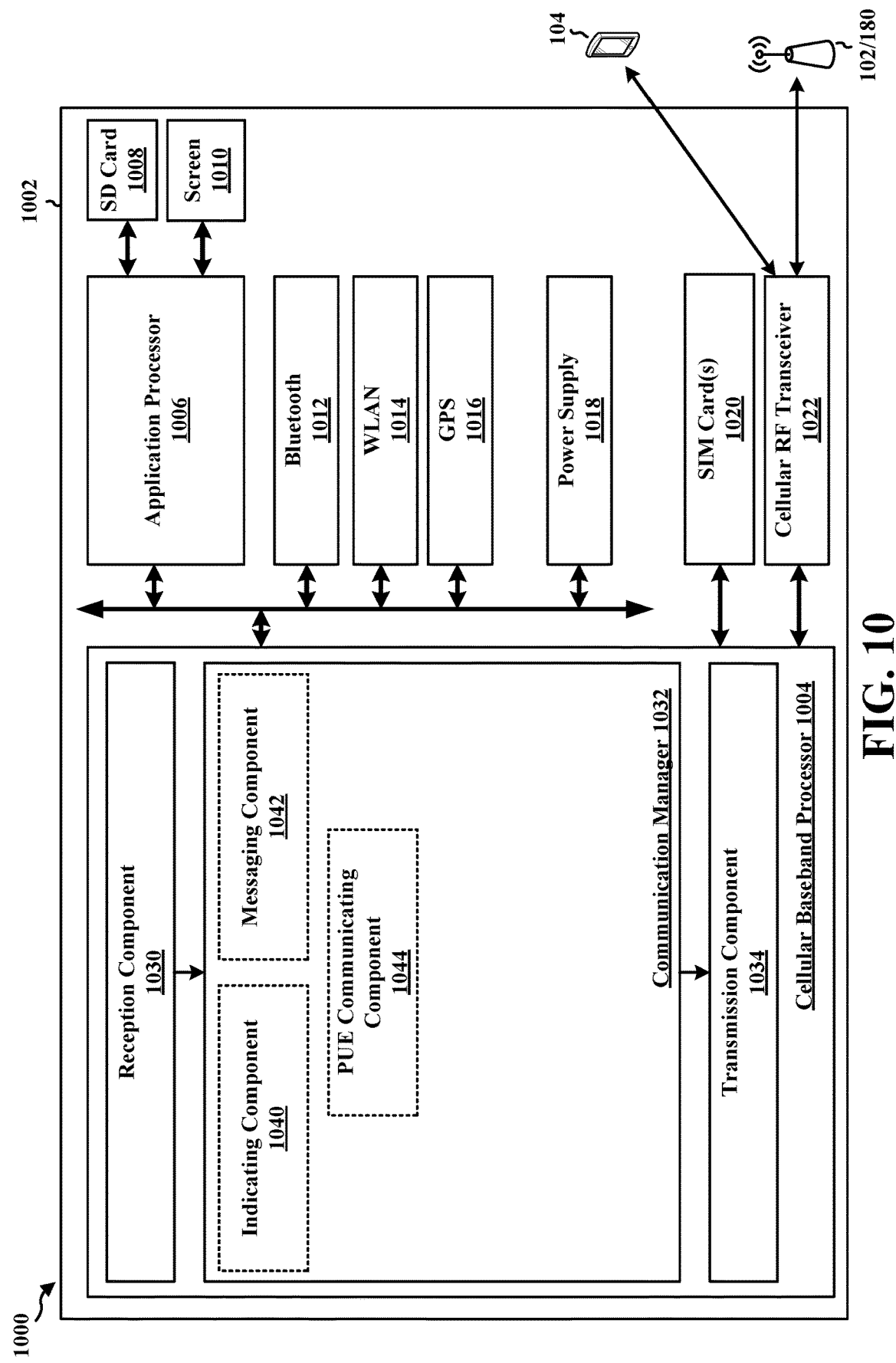
FIG. 10 is a diagram illustrating another example of a hardware implementation for another example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or base station 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., the UE 350 of FIG. 3) and include the aforediscussed additional modules of the apparatus 1002.

The communication manager 1032 includes a PUE communicating component 1046 that is configured to receive, from a first UE 104, information associated with P2V communication on a first set of resources dedicated to the P2V communication, e.g., as described in connection with 802 of FIG. 8.

The communication manager 1032 may further include an indicating component 1040 that is configured to transmit a paging indicator on a second set of resources indicating a paging message is scheduled on a third set of resources allocated for V2P communication consecutive to the second set of resources, e.g., as described in connection with 804 of FIG. 8.

The communication manager 1032 may further include a messaging component 1042 that is configured to the paging message on the third set of resources after transmitting the paging indicator, with the paging message being associated with the V2P communication, e.g., as described in connection with 806 of FIG. 8

The apparatus 1002 may include additional components that perform some or all of the blocks, operations, signaling, etc. of the algorithm(s) in the aforementioned flowchart of FIG. 8. As such, some or all of the blocks, operations, signaling, etc. in the aforementioned flowchart of FIG. 8 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for transmitting a paging indicator on a first set of resources indicating a paging message is scheduled on a second set of resources allocated for V2P communication consecutive to the first set of resources; and means for transmitting the paging message on the second set of resources after transmitting the paging indicator, the paging message being associated with the V2P communication.

In one configuration, the first set of resources is included in a third set of resources allocated for P2V communication, and the first set of resources includes a last symbol of the third set of resources.

In one configuration, the third set of resources includes a gap symbol consecutively preceding the last symbol.

In one configuration, the first set of resources is included in a third set of resources allocated for a PSFCH.

In one configuration, a fourth set of resources allocated for P2V communication and preceding the third set of resources is separated from the third set of resources by a set of slots.

In one configuration, the paging indicator includes one of a common sequence or a sequence that is based on information identifying a second UE to which the paging message is transmitted.

In one configuration, the apparatus 1002, and in particular the cellular baseband processor 1004, may further include means for receiving, from a second UE, information associated with P2V communication on a third set of resources dedicated to the P2V communication, and the third set of resources does not overlap in time with the second set of resources.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a first user equipment (UE), associated with a pedestrian comprising:
monitoring a first set of resources to detect a paging indicator indicating a paging message is carried on a second set of resources allocated for vehicle-to-pedestrian (V2P) communication consecutive in time to the first set of resources, the V2P communication being transmitted between the UE and a second UE associated with a vehicle, wherein the first set of resources is included in a third set of resources allocated for pedestrian-to-vehicle (P2V) communication via a physical sidelink feedback channel (PSFCH), and the first set of resources comprises a last symbol of the third set of resources;
decoding information on the second set of resources to detect the paging message from a second UE when the paging indicator is detected, wherein the paging message is transmitted on the second set of resources after transmitting the paging indicator and during resources scheduled for the PSFCH, the paging message being associated with the V2P communication; and refraining from decoding the information on the second set of resources when the paging indicator is undetected.

2. The method of claim 1, wherein the third set of resources comprises a gap symbol consecutively preceding the last symbol.

3. The method of claim 1, wherein a fourth set of resources allocated for P2V communication and preceding the third set of resources in time is separated from the third set of resources by a set of slots that is unmonitored by the first UE.

4. The method of claim 1, wherein the paging indicator comprises one of a common sequence or a sequence that is based on information identifying the first UE.

5. The method of claim 1, further comprising:
transmitting information associated with P2V communication on a third set of resources dedicated to the P2V communication,
wherein the third set of resources does not overlap in time with the second set of resources.

6. The method of claim 5, wherein the information associated with the P2V communication is transmitted on the third set of resources based on one of random selection or carrier sensing.

7. The method of claim 1, wherein the second set of resources is non-dedicated to the V2P communication such that other types of communication are allowed, and wherein the third set of resources is dedicated to the P2V communication such that other types of communication are prohibited.

8. The method of claim 1, wherein information on each symbol over each sub-channel of the second set of resources allocated for the V2P communication is decoded.

9. The method of claim 1, wherein the refraining from decoding the information on the second set of resources when the paging indicator is undetected comprises:
transitioning to a low-power state from a high-power state, the first UE being in the high-power state when monitoring the first set of resources.

10. The method of claim 1, wherein the first and the second set of resources each comprise a set of time resources, a set of frequency resources, a set of code resources, or any combination thereof.

11. The method of claim 1, wherein the paging indicator occupies the last symbol of the third set of resources.

12. A method of wireless communication by a vehicular user equipment (VUE), comprising:
transmitting a paging indicator on a first set of resources indicating a paging message is scheduled on a second set of resources allocated for vehicle-to-pedestrian (V2P) communication consecutive to the first set of resources, the V2P communication being transmitted between the VUE and a second UE associated with a pedestrian, wherein the first set of resources is included in a third set of resources allocated for pedestrian-to-vehicle (P2V) communication via a physical sidelink feedback channel (PSFCH), and the first set of resources comprises a last symbol of the third set of resources; and
transmitting the paging message on the second set of resources after transmitting the paging indicator during resources scheduled for the PSFCH, the paging message being associated with the V2P communication.

13. The method of claim 12, wherein the third set of resources comprises a gap symbol consecutively preceding the last symbol.

14. The method of claim 12, wherein a fourth set of resources allocated for P2V communication and preceding the third set of resources is separated from the third set of resources by a set of slots.

15. The method of claim 12, wherein the paging indicator comprises one of a common sequence or a sequence that is based on information identifying a second UE to which the paging message is transmitted.

16. The method of claim 12, further comprising:
receiving, from a second UE, information associated with P2V communication on a third set of resources dedicated to the P2V communication,
wherein the third set of resources does not overlap in time with the second set of resources.

17. The method of claim 12, wherein the paging indicator occupies the last symbol of the third set of resources.

18. An apparatus for wireless communication by a first user equipment (UE) associated with a pedestrian, comprising:
a memory; and
one or more processors, individually or in combination, coupled to the memory and configured to:
monitor a first set of resources to detect a paging indicator indicating a paging message is carried on a second set of resources allocated for vehicle-to-pedestrian (V2P) communication consecutive in time to the first set of resources, the V2P communication being transmitted between the UE and a second UE associated with a vehicle, wherein the first set of resources is included in a third set of resources allocated for pedestrian-to-vehicle (P2V) communication via a physical sidelink feedback channel (PSFCH), and the first set of resources comprises a last symbol of the third set of resources;
decode information on the second set of resources to detect the paging message from a second UE when the paging indicator is detected, wherein the paging message is transmitted on the second set of resources after transmitting the paging indicator and during resources scheduled for the PSFCH, the paging message being associated with the V2P communication; and
refrain from decoding the information on the second set of resources when the paging indicator is undetected.

19. The apparatus of claim 18, wherein the third set of resources comprises a gap symbol consecutively preceding the last symbol.

20. The apparatus of claim 18, wherein a fourth set of resources allocated for P2V communication and preceding the third set of resources in time is separated from the third set of resources by a set of slots that is unmonitored by the first UE.

21. The apparatus of claim 18, wherein the paging indicator comprises one of a common sequence or a sequence that is based on information identifying the first UE.

22. The apparatus of claim 18, wherein the paging indicator occupies the last symbol of the third set of resources.

23. An apparatus of wireless communication by a vehicular user equipment (VUE), comprising:
a memory; and
one or more processors, individually or in combination, coupled to the memory and configured to:

transmit a paging indicator on a first set of resources indicating a paging message is scheduled on a second set of resources allocated for vehicle-to-pedestrian (V2P) communication consecutive to the first set of resources, the V2P communication being transmitted between the VUE and a second UE associated with a pedestrian, wherein the first set of resources is included in a third set of resources allocated for pedestrian-to-vehicle (P2V) communication via a physical sidelink feedback channel (PSFCH), and the first set of resources comprises a last symbol of the third set of resources; and transmit the paging message on the second set of resources after transmitting the paging indicator during resources scheduled for the PSFCH, the paging message being associated with the V2P communication.

24. The apparatus of claim 23, wherein the third set of resources comprises a gap symbol consecutively preceding the last symbol.

25. The apparatus of claim 23, wherein a fourth set of resources allocated for P2V communication and preceding the third set of resources is separated from the third set of resources by a set of slots.

26. The apparatus of claim 23, wherein the paging indicator occupies the last symbol of the third set of resources.

* * * * *